(12) United States Patent
Kosaka et al.

(10) Patent No.: US 11,961,318 B2
(45) Date of Patent: Apr. 16, 2024

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventors: Fumi Kosaka, Kanagawa (JP); Akinobu Yamaguchi, Kanagawa (JP); Junichi Shimizu, Kanagawa (JP); Shinya Nakamura, Kanagawa (JP); Jun Ando, Kanagawa (JP); Masanori Yoshizuka, Kanagawa (JP); Akane Abe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 734 days.

(21) Appl. No.: 16/933,957

(22) Filed: Jul. 20, 2020

(65) Prior Publication Data
US 2021/0295032 A1 Sep. 23, 2021

(30) Foreign Application Priority Data
Mar. 23, 2020 (JP) ................................ 2020-050658

(51) Int. Cl.
*G06V 30/414* (2022.01)
*G06V 30/14* (2022.01)
*G06V 30/416* (2022.01)
*G06V 30/10* (2022.01)

(52) U.S. Cl.
CPC ........ *G06V 30/414* (2022.01); *G06V 30/1448* (2022.01); *G06V 30/416* (2022.01); *G06V 30/10* (2022.01)

(58) Field of Classification Search
CPC .... G06V 30/10; G06V 30/414; G06V 30/416; G06V 30/1448; G06F 16/30
See application file for complete search history.

(56) References Cited

U.S. PATENT DOCUMENTS

| 5,523,945 A | * | 6/1996 | Satoh | ................. | G06F 16/3344 |
| | | | | | 707/750 |
| 10,867,171 B1 | * | 12/2020 | Contryman | .......... | G06V 10/242 |
| 2018/0232573 A1 | | 8/2018 | Yamazaki | | |
| 2021/0073535 A1 | * | 3/2021 | Enomoto | ............. | G06V 30/416 |

FOREIGN PATENT DOCUMENTS

JP 2018128996 8/2018

* cited by examiner

*Primary Examiner* — Daniel G Mariam
(74) *Attorney, Agent, or Firm* — JCIPRNET

(57) ABSTRACT

An information processing device includes a processor configured to acquire a document image illustrating a document, acquire a related character string associated with a target character string included in the document image, and extract target information corresponding to the target character string from a region set with reference to a position of the related character string in the document image.

10 Claims, 7 Drawing Sheets

FIG. 6

| KEY | RELATED CHARACTER STRING |
|---|---|
| (HEREINAFTER, "THE LAND") | LOCATION |
|  | LOT |
|  | CATEGORY |
|  | AREA |
| ... | ... |

RELATED CHARACTER STRING SELECTION SCREEN

☑ LOCATION — 122 — 123 MINATOMIRAI, NISHI WARD, YOKOHAMA — 126

☑ LOT — 123 — NO. XXXX — 127

☑ CATEGORY — 124 — RESIDENTIAL — 128

☑ AREA — 125 — 80.21 SQUARE METERS — 129

PLEASE SELECT THE RELATED CHARACTER STRING(S) TO ASSOCIATE.

136 — OK    CANCEL

VALUE SELECTION SCREEN

☑ LOCATION — 122    123 MINATOMIRAI, NISHI WARD, YOKOHAMA — 126   140

☐ LOT — 123    NO. XXXX — 127

☑ CATEGORY — 124    RESIDENTIAL — 128

☑ AREA — 125    80.21 SQUARE METERS — 129

PLEASE SELECT THE VALUE(S) TO USE.

141 — [ OK ]   [ CANCEL ]

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-050658 filed Mar. 23, 2020.

BACKGROUND

(i) Technical Field

The present disclosure relates to an information processing device and a non-transitory computer readable medium.

(ii) Related Art

Technology that uses key-value extraction technology to extract target information from a document has been disclosed. For example, Japanese Unexamined Patent Application Publication No. 2018-128996 describes a technology that specifies a region containing a keyword, and performs a character recognition process on the specified region to extract a value.

SUMMARY

With the key-value extraction technology of the related art, target information is extracted from nearby a target character string. However, in a document such as a contract, in some cases, the target information does not exist near the target character string, and the target information is recorded near a character string different from the target character string. For example, in the case where the target character string is "the Land" and the target information with respect to the target character string is attribute information about the land, the target information with respect to the target character may be recorded near character strings indicating properties such as "Location", "Lot", "Area", and "Category" in some cases. In such cases, because the target information does not exist near the target character string, extraction of the target information may be unsuccessful with the key-value extraction technology of the related art.

Aspects of non-limiting embodiments of the present disclosure relate to extracting target information with respect to a target character string even in the case where the target information does not exist in a region set with reference to the position of the target character string in a document image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device includes a processor configured to acquire a document image illustrating a document, acquire a related character string associated with a target character string included in the document image, and extract target information corresponding to the target character string from a region set with reference to a position of the related character string in the document image.

BRIEF DESCRIPTION OF THE DRAWINGS

An exemplary embodiment of the present disclosure will be described in detail based on the following figures, wherein:

FIG. 6 is a diagram illustrating an example of a relationship dictionary;

FIG. 7 is a diagram illustrating an example of a selection screen; and

FIG. 8 is a diagram illustrating an example of a selection screen.

DETAILED DESCRIPTION

1. Configuration

Figure 1:
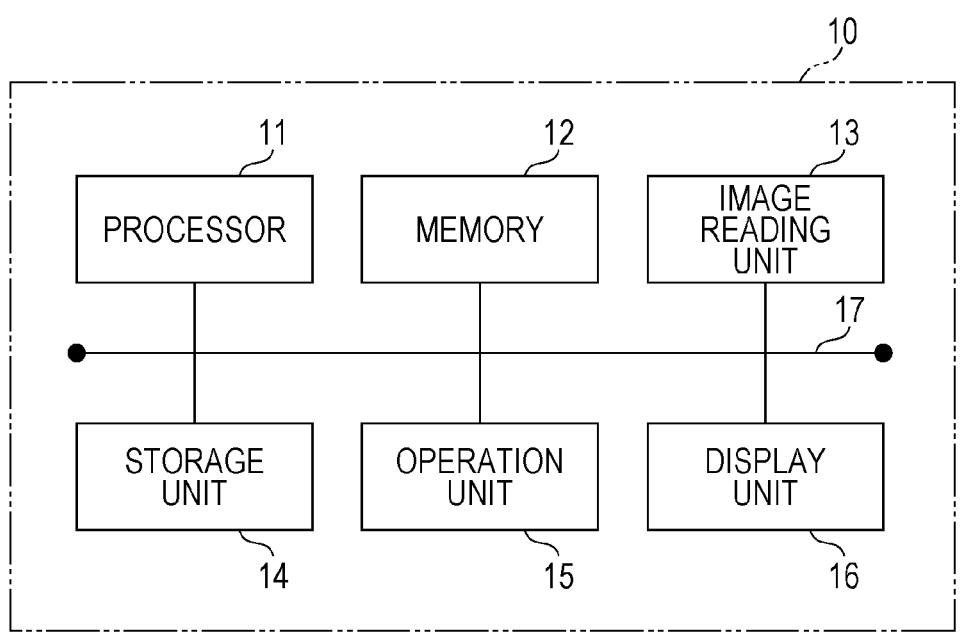
FIG. 1 is a diagram illustrating an example of the configuration of an image processing device 10 according to an exemplary embodiment.

FIG. 1 is a diagram illustrating an example of the configuration of an image processing device 10 according to an exemplary embodiment. The image processing device 10 is one example of an information processing device according to an exemplary embodiment of the present disclosure. The image processing device 10 reads a document by scanning, and acquires a document image. The document may include documents in a fixed format, such as a form, or documents in a non-fixed format, such as a quotation or a contract. Also, the image processing device 10 has a character recognition function, and extracts a value on the basis of a key included in the document image. The key is a character string that serves as a marker of the value. The key may include at least one of a character, a numeral, and a symbol. The key is an example of a "target character string" according to an exemplary embodiment of the present disclosure. The value is information desired by a user. The value may include at least one of a character, a numeral, a symbol, and an image. The image may be a photograph, a seal impression, or a figure. The value is an example of "target information" according to an exemplary embodiment of the present disclosure. Note that it is assumed that the "character string" referred to herein may include not only characters, but also numerals and symbols. The value extracted from the document image is used in various processes. For example, the value extracted from the document image may be used in a file name or a folder name of the document image, or may be transmitted to a destination prescribed for the value.

The image processing device 10 is provided with a processor 11, memory 12, an image reading unit 13, a storage unit 14, an operation unit 15, and a display unit 16. These hardware elements are connected through a bus 17. By executing a program, the processor 11 controls each unit of the image processing device 10 and performs a process of extracting a value corresponding to a key from the document image. For the processor 11, a central processing unit (CPU) is used for example. The memory 12 stores the program executed by the processor 11. For the memory 12, read-only memory (ROM) and random access memory (RAM) are used for example. The image reading unit 13 reads a document to generate a document image. For the image reading unit 13, an image scanner is used for example. The storage unit 14 stores the document image generated by the image reading unit 13 and values extracted from the document image. For the storage unit 14, a hard disk drive or a solid-state drive (SSD) is used for example. The operation unit 15 is used by the user to operate the image processing device 10. For the operation unit 15, a touch panel and one or more buttons are used for example. The display unit 16 displays various screens that the user uses to perform operations. For the display unit 16, a liquid crystal display is used for example.

Figure 2:
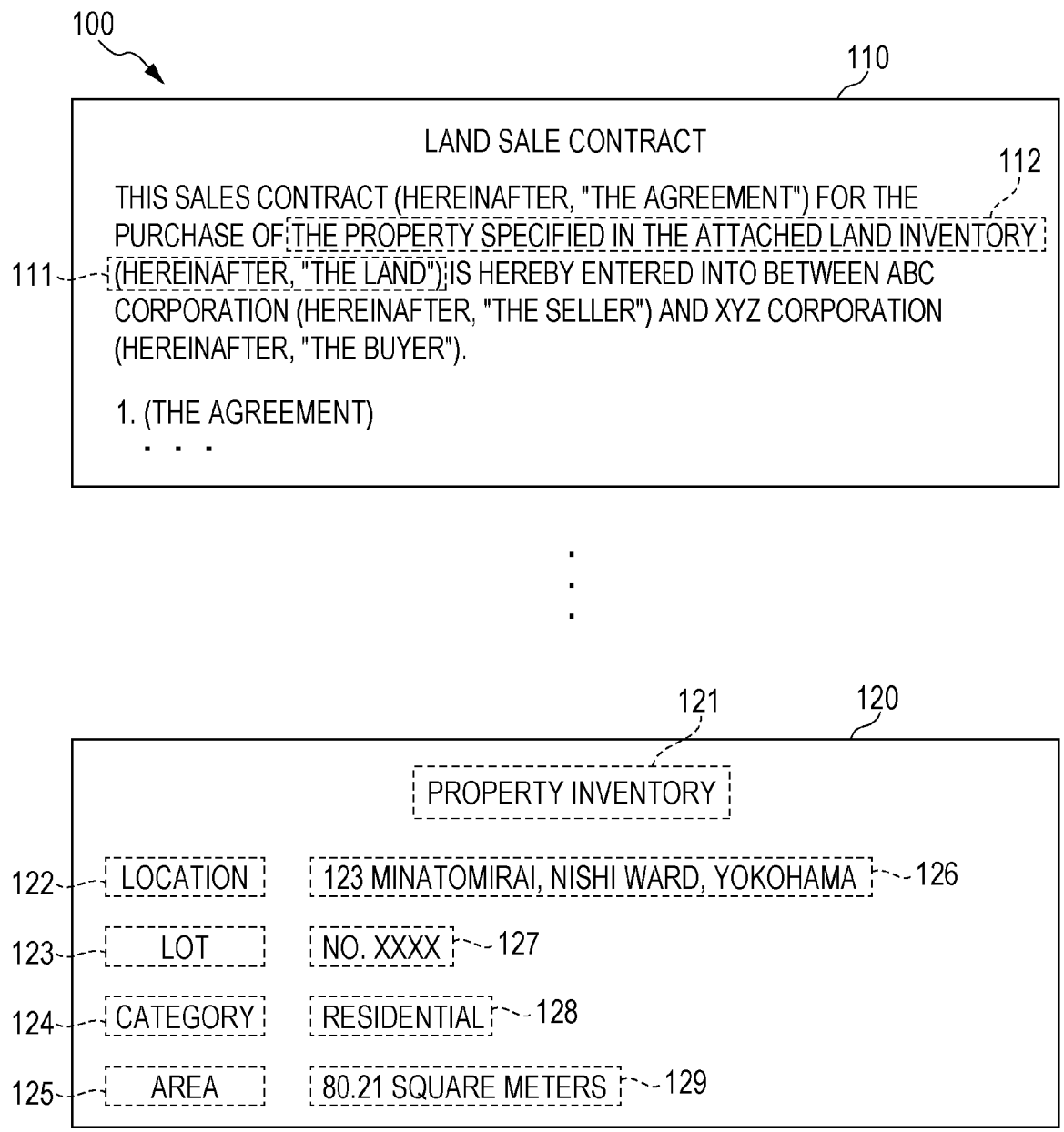
FIG. 2 is a diagram illustrating an example of a document image.

FIG. 2 is a diagram illustrating an example of a document image 100. The document image 100 illustrated in FIG. 2 is an image illustrating a land sale contract, and has multiple pages. The document image 100 includes a first page 110 and a fourth page 120. Here, the key is '(hereinafter, "the Land")', and the value is assumed to be detailed information with which the specifics of the land may be specified.

On the page 110, a key 111 stating '(hereinafter, "the Land")' is recorded. However, the value corresponding to the key 111, that is, the detailed information about the land, is not recorded near the key 111. Instead, a referral character string 112 indicating a reference stating "the land specified in the attached property inventory" is recorded in a predetermined region set with reference to the position of the key 111 (hereinafter referred to as the "surrounding range"). This indicates that the value corresponding to the key 111 is recorded on the separate page 120 titled "Property Inventory".

In the upper part of the page 120, a title 121 stating "Property Inventory" in a larger-than-standard font size is recorded. However, neither the key 111 stating '(hereinafter, "the Land")', the referral character string 112, nor a partial character string thereof is recorded on the page 120. Instead, on the page 120, a character string 122 stating "Location", a character string 123 stating "Lot", a character string 124 stating "Category", and a character string 125 stating "Area" related to the key 111 are recorded. All of these character strings 122 to 125 indicate items of attribute information about the land. Also, on the page 120, detailed information about the land, namely information 126 stating "123 Minatomirai, Nishi Ward, Yokohama" as the location of the land, information 127 stating "No. XXXX" as the lot number of the land, information 128 stating "Residential" as the category of the land, and information 129 stating "80.21 square meters" as the area of the land are recorded in the surrounding ranges of the character strings 122 to 125. The information 126 to 129 is detailed information with which the specifics of the land may be specified, and therefore are values corresponding to the key 111. In this way, four values exist for the key 111.

2. Operations

In the following description, the case where the processor 11 is described as the agent of the processes means that the processes are performed by the processor 11 performing calculations or controlling the operations of other hardware elements through cooperation between the program stored in the memory 12 and the processor 11 executing the program.

Figure 3:
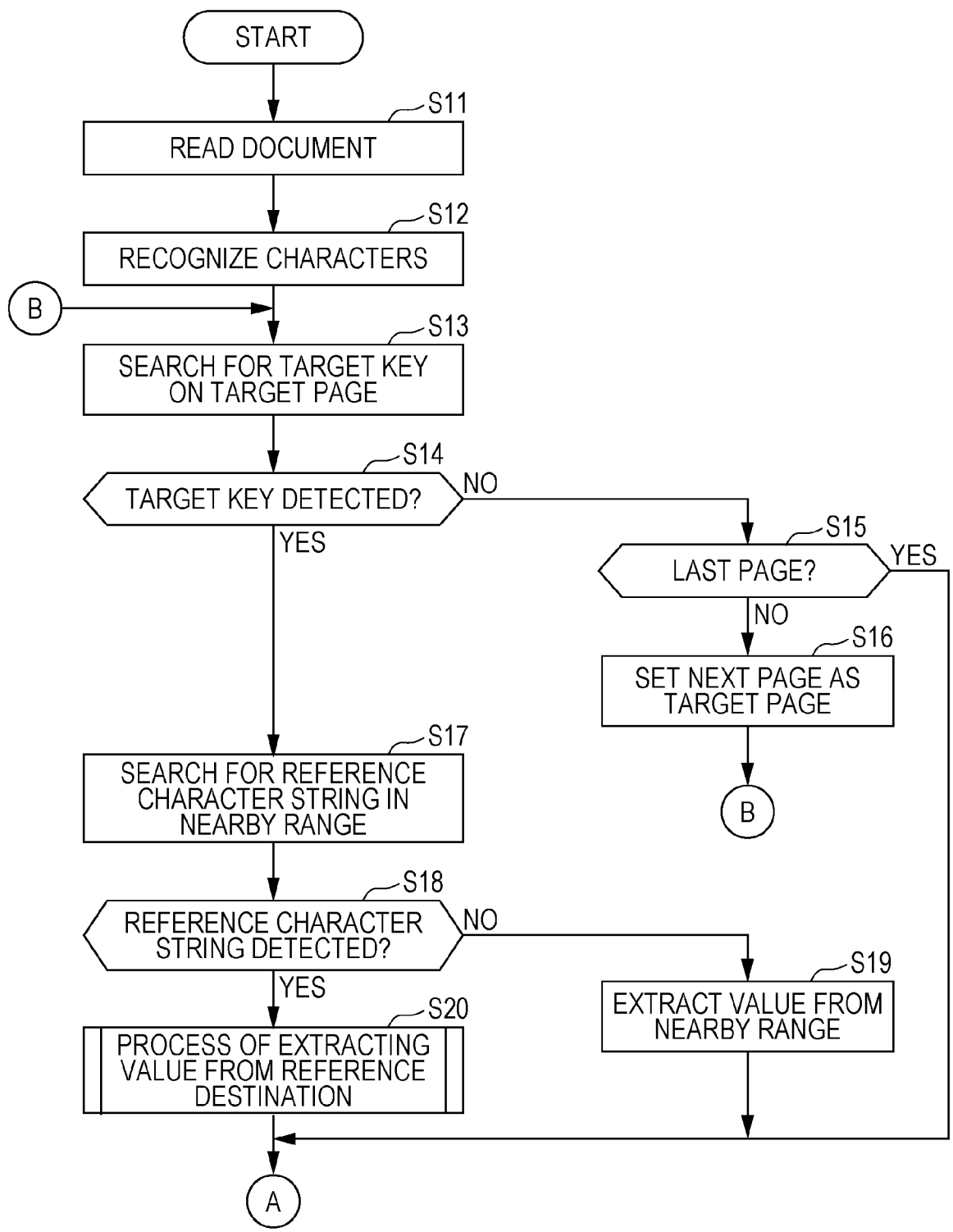
FIG. 3 is a flowchart illustrating an example of operations by the image processing device.
Figure 4:
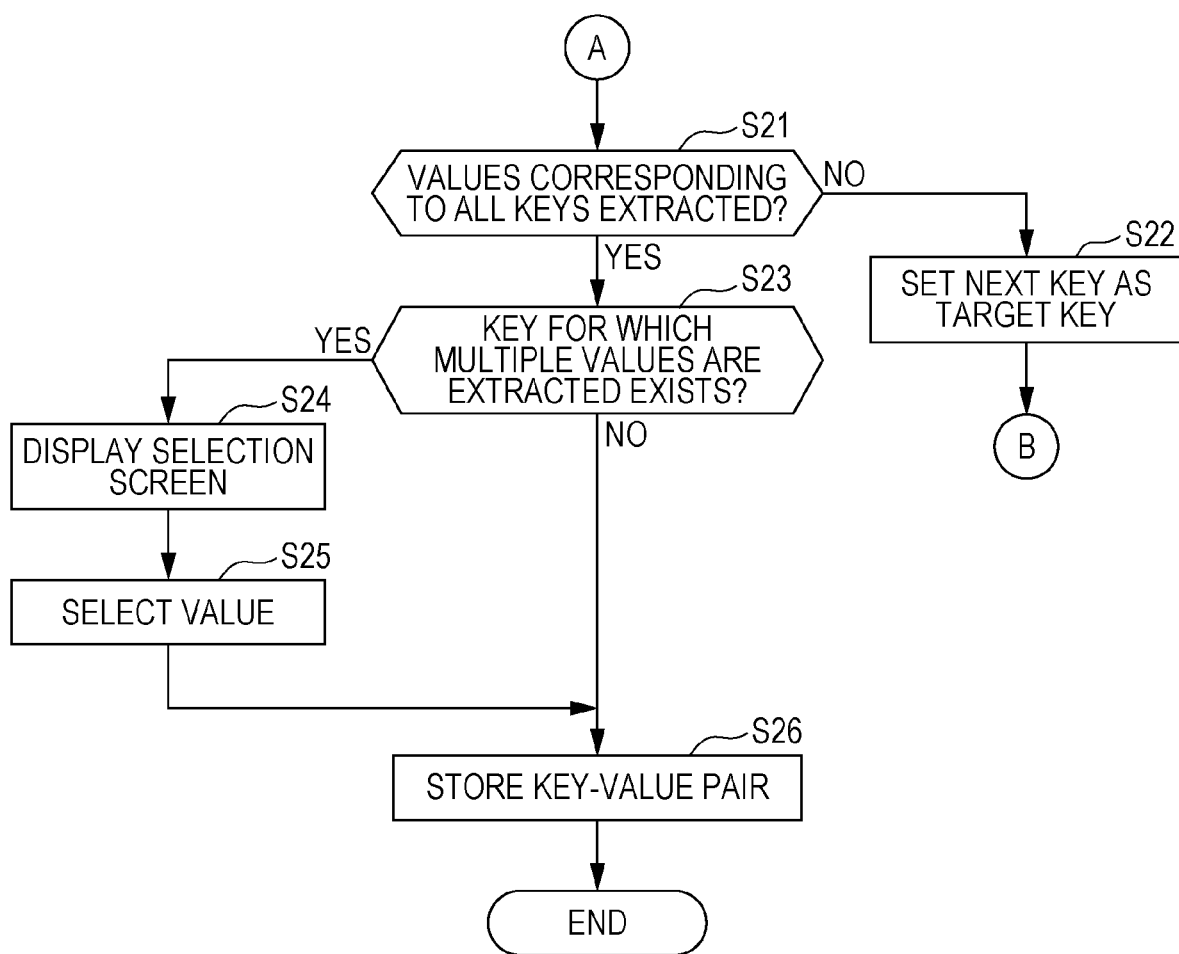
FIG. 4 is a flowchart illustrating an example of operations by the image processing device.

FIGS. 3 and 4 are flowcharts illustrating one example of operations by the image processing device 10. The process illustrated in FIG. 3 is started in response to, for example, the user setting a document in the image processing device 10 and using the operation unit 15 to perform an instruction operation to start reading the document. In step S11, the processor 11 causes the image reading unit 13 to read a document according to the operation. With this arrangement, a document image illustrating the document is acquired. In the example illustrated in FIG. 2, the land sale contract is read, and the document image 100 illustrating the land sale contract is acquired.

In step S12, the processor 11 recognizes characters included in the document image obtained in step S11. For the character recognition, optical character recognition (OCR) is used for example.

In step S13, the processor 11 searches a target page of the document image for a target key. In the initial state, the target page is the first page, and the target key is the first key. Here, the first key is assumed to be '(hereinafter, "the Land")'. The key is preregistered. In this case, the key stating '(hereinafter, "the Land")' is found on the first page.

In step S14, the processor 11 determines whether or not the target key is detected as a result of the search in step S13. In the case where the target key is not detected (NO in the determination of step S14), the flow proceeds to step S15, and the processor 11 determines whether or not the target page is the last page. In the case where the target page is the last page (YES in the determination of step S15), the flow proceeds to step S21 illustrated in FIG. 4. On the other hand, in the case where the target page is not the last page (NO in the determination of step S15), the flow proceeds to step S16, and after the processor 11 sets the next page as the target page, the flow returns to step S13 described above. With this arrangement, the process from step S13 to S14 is repeated for the next page. On the other hand, in the case where the target key is detected (YES in the determination of step S14), the flow proceeds to step S17. In the example illustrated in FIG. 2, because the key 111 stating '(hereinafter, "the Land")' is recorded on the first page 110, the key 111 is detected, and the flow proceeds to step S17. The detected key 111 is stored in the memory 12.

In step S17, the processor 11 searches for a referral character string in the surrounding range of the target key detected in step S14. Here, the surrounding range is assumed to be between the closest comma preceding the target key and the target key. Also, the referral character string is assumed to be a character string including "attached". In step S18, the processor 11 determines whether or not a referral character string is detected as a result of the search in step S17. In the case where the referral character string is not detected (NO in the determination of step S18), the flow proceeds to step S19, and the processor 11 extracts a value from the surrounding range of the target key. In the case where the format of the value is predetermined, information in the predetermined format included in the surrounding range is extracted as the value. Thereafter, the extracted value is stored in the memory 12.

On the other hand, in step S18 described above, in the case where a referral character string is detected (YES in the determination of step S18), the flow proceeds to step S20, and the processor 11 performs a process of extracting a value corresponding to the target key from the reference indicated by the referral character string detected in step S18. Here, the surrounding range of the key 111 is assumed to be between the closest comma preceding the key 111 and the key 111. In the example illustrated in FIG. 2, the referral character string 112 stating "the land specified in the attached property inventory" is recorded in the surrounding range of the key 111. For this reason, the referral character string 112 is detected in step S18 described above. Additionally, in step S20 described above, the process of extracting a value corresponding to the target key from the reference indicated by the referral character string 112 is performed.

Figure 5:
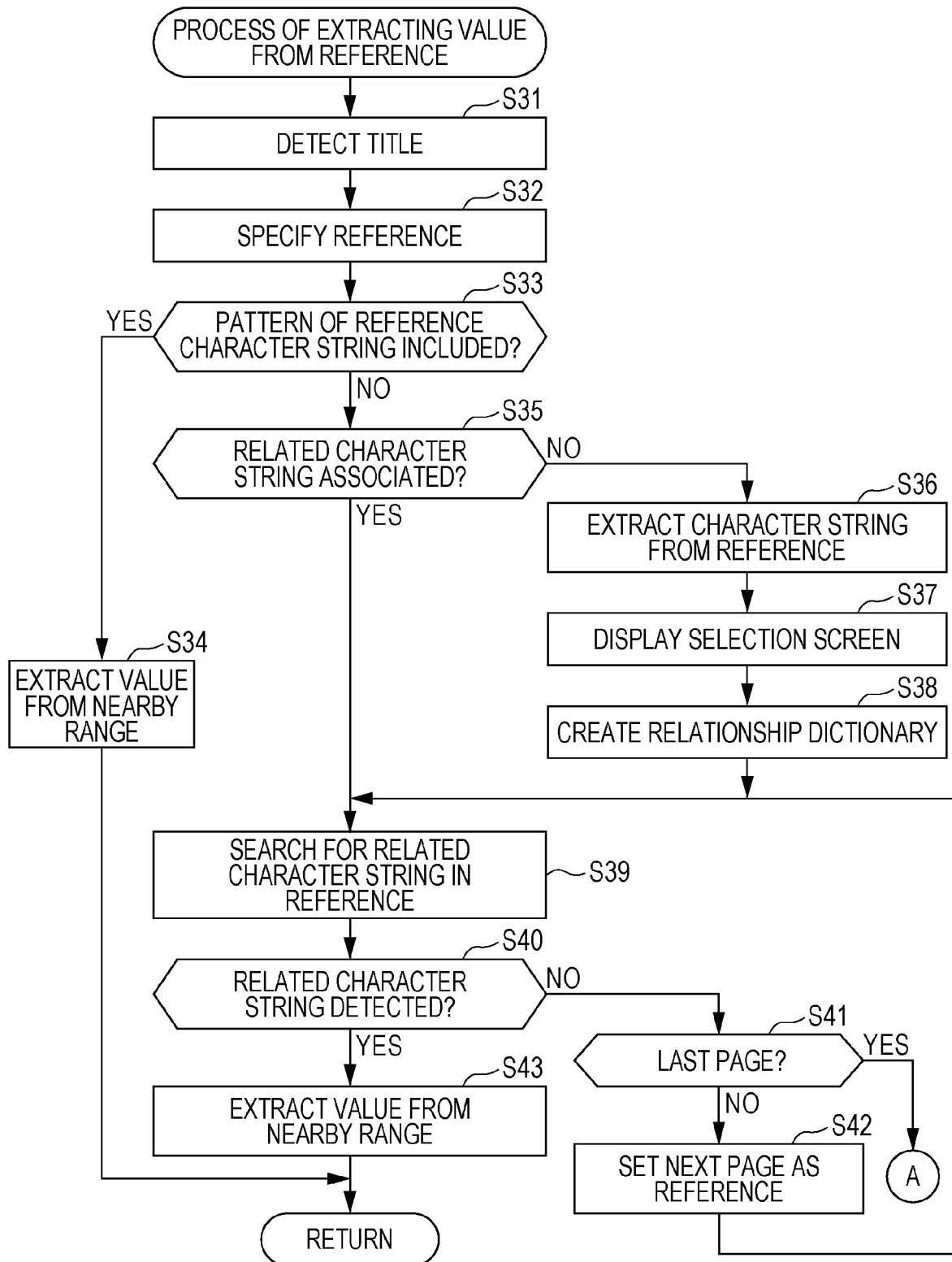
FIG. 5 is a flowchart illustrating an example of a process of extracting a value from a reference.

FIG. 5 is a flowchart illustrating one example of the process of extracting a value from a reference performed in step S20. In step S31, the processor 11 detects a title from each page of the document image. Note that the title detection does not necessarily have to be performed for all pages. For example, the title detection may be performed on the page(s) after the target page, and does not have to be performed on the target page. The title detection is performed on the basis of conceivable positions where the title would be recorded on a page, and conceivable font sizes that would be used for the title, for example. In the document image 100 illustrated in FIG. 2, the titles are recorded in a larger-than-standard font size in the upper part of each page. In this case, the character string in a larger-than-standard font size recorded in the upper part of each page is detected as the title. For the page 120, the character string "Property Inventory" is detected as the title 121. Titles are detected according to a similar method on other pages included in the document image 100. Note that in the case where a title is not detected, a character string recorded on the first line of the page may also be used. Also, in the case where a title has already been detected in step S12 described above, step S31 may be skipped.

In step S32, the processor 11 specifies a reference according to the title detected in step S31. For example, the page having the title corresponding to the referral character string 112 is specified as the reference. The title corresponding to the referral character string 112 may also be a title containing a character string that is at least a part of the referral character string 112, or a title that resembles the referral character string 112. In the example illustrated in FIG. 2, the title 121 on the page 120 includes the character string "Property Inventory", which is part of the referral character string 112 stating "the land specified in the attached property inventory". In this case, the page 120 having the title 121 is specified as the reference.

In step S33, the processor 11 determines whether or not a pattern of the referral character string 112 is included in the reference specified in step S32. For example, the flow moves to the page 120 illustrated in FIG. 2, and pattern matching is used to search for the referral character string 112 stating "the land specified in the attached property inventory". For the pattern matching, partial character strings expressed as regular expressions of the referral character string 112, such as "property", "inventory", and "land", are used for example. Additionally, in the case where the page 120 of the reference is searched for a partial character string of the referral character string 112, and a partial character string of the referral character string 112 is detected as a result of the search, it is determined that a pattern of the referral character string 112 is included on the page 120 (YES in the determination of step S33), and the flow proceeds to step S34.

In step S34, the processor 11 extracts a value from the surrounding range of the pattern of the referral character string 112 in the reference specified in step S32. In the case where the format of the value is predetermined, information in the predetermined format included in the surrounding range is extracted as the value. Thereafter, the extracted value is stored in the memory 12.

On the other hand, in the example illustrated in FIG. 2, a pattern of the referral character string 112 such as "property", "inventory", or "land" is not included in the body text (excluding the title 121) of the page 120 (NO in the determination of step S33). In this case, the flow proceeds to the process of step S35. In step S35, the processor 11 determines whether or not a related character string is associated with the target key. For example, in the case where a relationship dictionary 130 that associates the target key with related character strings is stored in the storage unit 14, it is determined that a relationship dictionary 130 corresponding to the target key exists (YES in the determination of step S35), and the flow proceeds to step S39.

FIG. 6 is a diagram illustrating an example of the relationship dictionary 130. The relationship dictionary 130 includes keys and related character strings. One or more related character strings are associated with each key. In the example illustrated in FIG. 6, the character string 122 stating "Location", the character string 123 stating "Lot", the character string 124 stating "Category", and the character string 125 stating "Area" are associated with the key 111 stating '(hereinafter, "the Land")'. The association between keys and related character strings is performed according to an operation by the user or an administrator, for example. Alternatively, a dictionary may be used to extract terms of subordinate concepts to a key, and the extracted terms may be associated with the key as related character strings. In this case, only the terms selected according to an operation by the user from among the terms of subordinate concepts of the keys may be associated with the key as related character strings.

In step S39, the processor 11 uses the relationship dictionary 130 to search for a related character string in the reference specified in step S32. In the example illustrated in FIG. 2, first, the flow moves to the page 120 of the reference. In the relationship dictionary 130 illustrated in FIG. 6, the character strings 122 to 125 stating "Location", "Lot", "Category", and "Area" are associated with the key 111 stating '(hereinafter, "the Land")' as related character strings. In this case, these character strings 122 to 125 are acquired from the relationship dictionary 130 as related character strings. Additionally, the page 120 of the reference is searched for these character strings 122 to 125.

In step S40, the processor 11 determines whether or not a related character string is detected as a result of the search in step S39. In the case where a related character string is not detected (NO in the determination of step S40), the flow proceeds to step S41, and the processor 11 determines whether or not the reference is the last page. In the case where the reference is the last page (YES in the determination of step S41), the flow proceeds to step S21 illustrated in FIG. 5. On the other hand, in the case where the reference is not the last page (NO in the determination of step S41), the flow proceeds to step S42, and after the processor 11 sets the next page as the reference, the flow returns to step S39 described above. With this arrangement, the process from step S39 to S40 is repeated for the next page. On the other hand, in step S40 described above, in the case where a related character string is detected (YES in the determination of step S40), the flow proceeds to step S43. In the example illustrated in FIG. 2, because related character strings, namely the character strings 122 to 125, are recorded on the page 120, these character strings 122 to 125 are detected. Subsequently, the flow proceeds to step S43.

In step S43, the processor 11 extracts a value from the surrounding range of a related character string detected in step S40. Here, the surrounding range is assumed to be a region of a size equal to or less than a predetermined distance extending to the left and right from the position of the related character string. Note that the direction and distance in which the surrounding range extends may be different depending on the related character string. In the case where the format of the value is predetermined, information in the predetermined format included in the surrounding range is extracted as the value. In the example illustrated in FIG. 2, the information 126 stating "123 Minatomirai, Nishi Ward, Yokohama" is extracted from the surrounding range of the character string 122 stating "Location" recorded on the page 120. Also, the information 127 stating "No. XXXX" is extracted from the surrounding range of the character string 123 stating "Lot" recorded on the page 120. Furthermore, the information 128 stating "Residential" is extracted from the surrounding range of the character string 124 stating "Category" recorded on the page 120. Furthermore, the information 129 stating "80.21 square meters" is extracted from the surrounding range of the character string 125 stating "Area" recorded on the page 120. The extracted information 126 to 129 is stored in the memory 12 as values corresponding to the key 111.

On the other hand, in step S35 described above, in the case where the relationship dictionary 130 is not stored in the storage unit 14 for example, it is determined that a related character string is not associated with the target key (NO in the determination of step S35), and the flow proceeds to step S36. In step S36, the processor 11 extracts a character string from the reference specified in step S32. At this time, all character strings included on the page 120 may be extracted, or some character strings included on the page 120 may be extracted according to a predetermined condition. In addition, information in the surrounding range of each character string may also be extracted together with each character string.

The predetermined condition may be a condition indicating that a character string is a predetermined character string corresponding to the target key, for example. In this case, only the predetermined character string is extracted with respect to the target key from among the character strings included on the page 120. In another example, the predetermined condition may be a condition indicating that a character string is a character string of a subordinate concept to the target key. In this case, only a character string of a subordinate concept to the target key is extracted from among the character strings included on the page 120. The character string of a subordinate concept may be specified using a dictionary, for example. In another example, the predetermined condition may be a condition indicating that a character string is a character string of a noun. In this case, the document included on the page 120 is analyzed to thereby extract only the character string of a noun from among the character strings included on the page 120, for example. Morphological analysis may be used to analyze the document, for example. In another example, in the case where a table is included on the page 120, the predetermined condition may be a condition indicating that a character string is a character string recorded in a predetermined column or row of the table. In this case, only a character string recorded in a predetermined column or row of the table is extracted from among the character strings included on the page 120. In the example illustrated in FIG. 2, character strings including "Location", "Lot", "Category", and "Area" are extracted from the page 120.

In step S37, the processor 11 causes the display unit 16 to display a selection screen 135 used in an operation of selecting a related character string from among the character strings extracted in step S36. FIG. 7 is a diagram illustrating an example of the selection screen 135. The selection screen 135 includes the character strings 122 to 125 stating "Location", "Lot", "Category", and "Area" extracted in step S36, and the information 126 to 129 stating "123 Minatomirai, Nishi Ward, Yokohama", "No. XXXX", "Residential", and "80.21 square meters" in the surrounding area of each of the character strings 122 to 125. The user uses the operation unit 15 to perform an operation of selecting the related character strings corresponding to the key 111 from among these character strings 122 to 125. For example, in the case of wanting to use the information 126 to 129 in the surrounding area of each of the character strings 122 to 125 stating "Location", "Lot", "Category", and "Area" as values corresponding to the key 111, the user uses the operation unit 15 to perform an operation of selecting these character strings 122 to 125, and then performs an operation of pressing an "OK" button 136. With this arrangement, these character strings 122 to 125 are selected as related character strings. Note that on the selection screen 135, character strings other than the character strings extracted in step S36 may also be added and selected according to an operation by the user.

In step S38, the processor 11 creates the relationship dictionary 130 using the related character strings selected by the operation by the user on the selection screen 135. For example, in the case where the character strings 122 to 125 stating "Location", "Lot", "Category", and "Area" are selected, a relationship dictionary 130 associating the key 111 stating '(hereinafter, "the Land")' with the character strings 122 to 125 stating "Location", "Lot", "Category", and "Area" is created, as illustrated in FIG. 6. The relationship dictionary 130 created in this way is stored in the storage unit 14. In this case, in step S39, the relationship dictionary 130 created in step S38 is used to search the reference for a related character string.

When the process of extracting one or more values from the reference ends, the flow proceeds to step S21 illustrated in FIG. 4, and the processor 11 determines whether or not values corresponding to all keys have been extracted. In the case where values corresponding to all keys have not been extracted (NO in the determination of step S21), the flow proceeds to step S22, and after the processor 11 sets the next key as the target key, the flow returns to step S13 illustrated in FIG. 3. With this arrangement, the process from step S13 to S21 described above is repeated for the next key. On the other hand, in the case where values corresponding to all keys have been extracted (YES in the determination of step S21), the flow proceeds to step S23.

In step S23, the processor 11 determines whether or not a key for which multiple values have been extracted exists. For example, in the case where one value each has been extracted for all keys (NO in the determination of step S23), the flow proceeds to step S26. On the other hand, in the case where multiple values have been extracted for at least one key (YES in the determination of step S23), the flow proceeds to step S24. In the example illustrated in FIG. 2, because the information 126 to 129 has been extracted as values corresponding to the key 111, the flow proceeds to step S24.

In step S24, the processor 11 causes the display unit 16 to display a selection screen 140 used in an operation of selecting a desired value from among multiple values. FIG. 8 is a diagram illustrating an example of the selection screen 140. The selection screen 140 includes the information 126 stating "123 Minatomirai, Nishi Ward, Yokohama", the information 127 stating "No. XXXX", the information 128 stating "Residential", and the information 129 stating "80.21 square meters" as values extracted with respect to the key 111 illustrated in FIG. 2. For example, in the case of selecting the information 126, 128, and 129 from among the information 126 to 129, the user performs an operation of selecting the information 126, 128, and 129, and then performs an operation of pressing an "OK" button 141. Note that the user does not necessarily need to select a subset of the information 126 to 129, and may also select all of the information 126 to 129.

In step S25, the processor 11 selects one or more values from among the multiple values in accordance with the operation by the user. For example, in the case where an operation of selecting the information 126, 128, and 129 is performed as illustrated in FIG. 8, the information 126, 128, and 129 is selected. In this case, the information 126, 128, and 129 is used as values corresponding to the key 111, whereas the information 127 is not used as a value corresponding to the key 111.

In step S26, the processor 11 causes the storage unit 14 to store pairs of each key and each value extracted in steps S19, S34, or S43. In the example illustrated in FIG. 8, pairs of the key 111 stating '(hereinafter, "the Land")' and the information 126 stating "123 Minatomirai, Nishi Ward, Yokohama", the information 128 stating "Residential", and the information 129 stating "80.21 square meters" are stored. The pairs may also include the character strings 122, 124, and 125 stating "Location", "Category", and "Area" in association with the information 126, 128, and 129. Also, the pairs of a key and a value may be added to the document image 100 as attribute information. After step S26, the process ends.

According to the exemplary embodiment described above, in the case where a value does not exist in the surrounding range of a key but a value exists in the surrounding range of a related character string of the key, the value is extracted from the surrounding range of the related character string. Consequently, it is possible to extract a value corresponding to the key even in such a case. It is also possible to extract a value corresponding to the key even in the case where the key, a referral character string, or a partial character string thereof is not included in the reference. Furthermore, in the case where a referral character string indicating a reference exists in the surrounding range of the key, a value corresponding to the key is extracted from the reference. Consequently, it is possible to extract a value even in such a case. In this case, because the flow moves to the reference and searches the reference for a related character string, the related character string may be detected rapidly compared to the case of searching the entire document image for the related character string, and the detection accuracy of the related character string is also improved. Furthermore, in the case where a related character string is not associated with a key in advance, a relationship dictionary 130 is created, and the relationship dictionary 130 is used to extract a value in the surrounding range of the related character string. Consequently, it is possible to extract a value in a region set with reference of the position of the related character string even in such a case. Furthermore, when the relationship dictionary 130 is created, only a character string selected according to an operation by the user from among the character strings included in the reference is included as a related character string in the relationship dictionary 130, and therefore a character string that is included in the reference but is undesired by the user may be excluded from the related character strings. Furthermore, in the case where multiple related character strings are associated with a single key, multiple values are extracted, and therefore these values may be extracted even in the case where multiple values exist with respect to a single key.

3. Exemplary Modifications

The exemplary embodiment described above is one example of the present disclosure. The present disclosure is not limited to the exemplary embodiment described above. In addition, the exemplary embodiment described may also be modified like the following examples. At this time, two or more of the following exemplary modifications may also be combined and used.

In the exemplary embodiment described above, in the case where a value is selected in step S25 above, the association with the key may also be removed for related character strings other than the related character string(s) corresponding to the selected value(s) from among the related character strings associated with the key. For example, as illustrated in FIG. 8, in the case where the information 127 stating "No. XXXX" is not selected, the association with the key 111 may be removed for the character string 123 stating "Lot" corresponding to the information 127 in the relationship dictionary 130. In this case, when extracting a value corresponding to the key 111 the next time and thereafter, the character string 123 stating "Lot" is no longer used as a related character string, and therefore the information 127 stating "No. XXXX" is no longer extracted as a value corresponding to the key 111. According to the exemplary modification, it is possible to keep a value not desired by the user from being extracted the next time and thereafter.

In the exemplary embodiment described above, the processor 11 may acquire attribute information, and acquire different related character strings associated with the key depending on the attribute information. The attribute information includes the type of document, the content of the document, and an identifier of the user or an identifier of an organization to which the user belongs, for example. The type of document includes types such as a contract or an order form, for example. The type of document is input according to an operation by the user, for example. For example, different related character strings may be acquired between the case where the type of document is a contract and the case where the type of document is an order form. The content of the document includes content dealing with an outsourcing contract or content dealing with a sales contract, for example. The content of the document is input according to an operation by the user, for example. Alternatively, the content of the document may be determined by analyzing the content of the document. For example, different related character strings may be acquired between the case where the content of the document is content dealing with an outsourcing contract and the case where the content of the document is content dealing with a sales contract. The identifier of the user includes a user ID, for example. The identifier of the user is input according to an operation by the user, for example. For example, different related character strings may be acquired between a user who performs work related to licensing and a user who performs work related to an outsourcing contract. The identifier of the organization to which the user belongs includes a division ID, for example. The identifier of the user input according to an operation by the user may be used to acquire the identifier of the organization from a database that associates the identifier of the user with the identifier of the organization to which the user belongs. For example, different related character strings may be acquired between a user who belongs to a division that performs work related to licensing and a user who belongs to a division that performs work related to an outsourcing contract. As the method of acquiring different related character strings depending on the attribute information, a different relationship dictionary 130 may be created for different attribute information, and related character strings may be acquired from the relationship dictionary 130 corresponding to the attribute information, for example. Alternatively, related character strings corresponding to the attribute information may be associated in the relationship dictionary 130, and the related character strings associated with the attribute information may be acquired. According to the exemplary modification, different values may be extracted depending on the attribute information. In addition, different values may be extracted depending on the type of document, the content of the document, the user, or the organization to which the user belongs.

In the exemplary embodiment described above, the flow does not necessarily have to move to the reference. For example, the entire document image 100 may be searched for a related character string. Even with such a method, a value corresponding to the key may be extracted from the surrounding range of the related character string.

In the exemplary embodiment described above, the relationship dictionary 130 may include a ranking. For example, in some cases, the related character strings may include character strings that resemble each other, such as "Address" and "Location". In this case, the character string stating "Address" may be assigned a rank of "1", while the character string stating "Location" may be assigned a lower rank of "2", for example. In this case, information in the surrounding range of the character string stating "Address" is extracted as a value, but information in the surrounding range of the character string stating "Location" is not extracted as a value.

In the exemplary embodiment described above, the relationship dictionary 130 does not always have to be used. For example, the user may perform an operation to select whether or not to use the relationship dictionary 130.

In the exemplary embodiment described above, a related character string associated with the key 111 itself stating '(hereinafter, "the Land")' does not exist, but in the case where a related character string associated with a partial character string of the key 111 exists, the related character string associated with the partial character string of the key 111 may be used to extract a value corresponding to the key 111.

In the exemplary embodiment described above, pattern matching may also be used when searching for a target keyword, a referral character string, or a related character string. For example, in the case where pattern matching is used to search for a related character string, a related character string is detected even in the case where only a part of the related character string is recorded in the reference.

In the exemplary embodiment described above, the key and the value do not necessarily have to be recorded on different pages. For example, on a single page, a related character string and a value may be recorded at a spot distant from the key. For example, the related character string and the value may be recorded in a different row, a different paragraph, or a different section from the key on a single page. In this case, in the case where a referral character string is not detected in the surrounding range of the target key on the target page (NO in the determination of step S18), the target page may be searched for a related character string of the target key, and a value may be extracted from the surrounding range of the related character string, for example.

In the exemplary embodiment described above, the key and the value are not limited to the example described above. For example, the value may be information with which a building subject to a contract may be specified, and the key may be a character string that serves as a marker of the value. In other words, the value may be any kind of information that is recorded in a document. Also, the key may be any kind of character string that serves as a marker of the value.

In the exemplary embodiment described above, some of the functions of the image processing device 10 may also be provided in an external device. For example, a server device connected to the image processing device 10 through a communication channel may perform the process of recognizing characters included in the document image.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

An exemplary embodiment of the present disclosure may also be provided as a program executed in the image processing device 10. The image processing device 10 is an example of a computer according to an exemplary embodiment of the present disclosure. The program may be downloaded through a communication channel such as the Internet, or may be provided by being recorded onto a computer readable recording medium such as a magnetic recording medium (such as magnetic tape or a magnetic disk), an optical recording medium (such as an optical disc), a magneto-optical recording medium, or semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
  a processor configured to:
   cause an image scanner to read a document to acquire a document image illustrating the document;
   perform optical character recognition on the document image to search for a target character string and target information corresponding to the target character string from the document image;
   in response to the target character string being detected and the target information not existing in a region set with reference to a position of the target character string in the document image, search for a related character string associated with the target character string included in the document image;
   in response to the related character string being detected, extract target information corresponding to the target character string from a region set with reference to a position of the related character string in the document image; and set the target character string and the target info illation as a key-value pair.

2. The information processing device according to claim 1, wherein
in a case where a referral character string indicating a reference is included in the region set with reference to the position of the target character string in the document image, the processor is configured to extract the target information from the region set with reference to the position of the related character string in the reference.

3. The information processing device according to claim 2, wherein
in a case where the target character string and the related character string are not associated, the processor is configured to associate a character string included in the reference with the target character string as the related character string.

4. The info illation processing device according to claim 3, wherein
in a case where the related character string is not associated with the target character string, the processor is configured to associate a character string selected according to an operation by a user from among at least one character string included in the reference with the target character string as the related character string.

5. The information processing device according to claim 1, wherein
the processor is configured to:
acquire a plurality of related character strings associated with the target character string; and
extract a plurality of target information corresponding to the target character string from a plurality of regions set with reference to positions of the plurality of related character strings.

6. The information processing device according to claim 5, wherein
the processor is configured to:
extract target information selected according to an operation by a user from among the plurality of target information included in the plurality of regions; and
remove an association with the target character string for a related character string other than the related character string corresponding to the selected target information from among the plurality of related character strings.

7. The information processing device according to claim 1, wherein
a plurality of related character strings are associated with the target character string, and
the processor is configured to:
acquire attribute information; and
acquire different related character strings associated with the target character string depending on the attribute information.

8. The information processing device according to claim 7, wherein
the attribute information includes a type of the document, content of the document, and an identifier of a user or an identifier of an organization to which the user belongs.

9. A non-transitory computer readable medium storing a program causing a computer to execute a process for processing information, the process comprising:
causing an image scanner to read a document to acquire a document image illustrating the document;
performing optical character recognition on the document image to search for a target character string and target information corresponding to the target character string from the document image;
in response to the target character string being detected and the target information not existing in a region set with reference to a position of the target character string in the document image, searching for a related character string associated with the target character string included in the document image;
in response to the related character string being detected, extracting target information corresponding to the target character string from a region set with reference to a position of the related character string included the document image; and
setting the target character string and the target information as a key-value pair.

10. An information processing device comprising:
document image acquiring means for causing an image scanner to read a document to acquire a document image illustrating the document;
target character string searching means performing optical character recognition on the document image to search for a target character string and target information corresponding to the target character string from the document image;
related character string searching means for, in response to the target character string being detected and the target information not existing in a region set with reference to a position of the target character string in the document image, searching for a related character string associated with the target character string included in the document image;
extracting means for, in response to the related character string being detected, extracting target information corresponding to the target character string from a region set with reference to a position of the related character string in the document image; and
setting means for setting the target character string and the target information as a key-value pair.

* * * * *